Patented Oct. 31, 1944

2,361,472

UNITED STATES PATENT OFFICE 2,361,472

IMIDAZOLE DERIVATIVES AND PROCESS OF PREPARING THE SAME

Charles Graenacher, Riehen, and Jost Frei, Basel, Switzerland, assignors to Society of Chemical Industry in Basle, Basel, Switzerland, a firm No Drawing. Application March 25, 1941, Serial No. 385,200. In Switzerland April 8, 1940

10 Claims. (Cl. 260—309)

In U. S. application Serial No. 335,136, filed May 14, 1940, it has been shown that new derivatives of heterocyclic compounds are obtained if imidazoles of the general formula

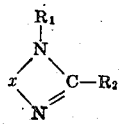

in which $x$ represents an aromatic nucleus containing at least one sulfonic acid group, $R_1$ and $R_2$ represent hydrogen or a substituent, or their salts are treated with alkylating or aralkylating agents, and, if desired, at any desirable stage of the reaction, further optional alkylating or aralkylating agents, which differ from the alkylating or aralkylating agents mentioned, are allowed to act upon the reaction compounds. Among other substances, alkylene oxides may be used as alkylating agents in this process. More exactly described, however, is the reaction of alkylene oxides with those imidazole sulfonic acids (or salts thereof) which contain at least one hydrogen atom belonging to an amino or imino group or to a hydroxyl group united to carbon.

It has now been found that, in a surprising manner, valuable derivatives of heterocyclic compounds are equally obtained if imidazoles of the general formula

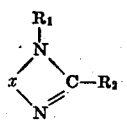

in which $x$ represents an aromatic nucleus containing, if desired, a free or neutralised sulfonic acid group and $R_1$ and $R_2$ represent substituents, and in which no hydrogen atom belongs to an amino or imino group or to an hydroxyl group combined with carbon, are treated with 1:2-alkylene oxides or their substitution products.

As imidazoles of the general formula

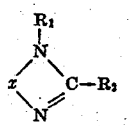

in which $x$, $R_1$ and $R_2$ have the meaning given above, may be used, for example, benzimidazoles and naphthimidazoles substituted at the 1-nitrogen atom and the 2-carbon atom and their sulfonic acids, in which no hydrogen atom belongs to an amino or an imino group or to a hydroxyl group combined with carbon, and which, for example, are derived from o-phenylenediamine or its homologues and analogues, such as o-toluylenediamine, or from o- or 1:8-naphthylenediamine. In these imidazoles, the substituent $R_1$ may represent, for example, a hydrocarbon radical, such as an alkyl or aralkyl radical. The substituent $R_1$ may, however, also stand for a hydrocarbon radical which is substituted, or the chain of which is interrupted by hetero-atoms, such as oxygen, sulfur, or nitrogen atoms, or by atomic groupings containing such atoms. The substituent $R_2$ in the above formula may represent, for example, a hydrocarbon radical, which may also be substituted or whose chain may be interrupted by hetero-atoms or atomic groupings containing hetero-atoms. Examples of such imidazole compounds are the N-substitution products of $\mu$-methyl, $\mu$-ethyl, $\mu$-propyl, $\mu$-isopropyl, $\mu$-butyl, $\mu$-amyl, $\mu$-heptyl, $\mu$-undecyl, $\mu$-pentadecyl, $\mu$-heptadecyl, and $\mu$-heptadecenyl benzimidazole or of $\mu$-undecylperimidine, and the sulfonic acids derived therefrom. N-substitution products which may be used are, for example, the N-alkyl or the N-aralkyl substitution products, among which may be mentioned N-methyl-$\mu$-heptadecylbenzimidazole sulfonic acid, N-methyl-$\mu$-undecylbenzimidazole sulfonic acid, N-benzyl-$\mu$-heptadecylbenzimidazole sulfonic acid, N-dodecyl-$\mu$-propylbenzimidazole sulfonic acid.

The products of the formula

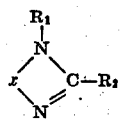

wherein $x$, $R_1$ and $R_2$ have the meaning indicated above may also be designated as $\mu$- and N-substituted imidazoles sulfonated if desired which are free from hydrogen atoms bound to nitrogen atoms or to oxygen atoms adhering to carbon atoms and in which the two imidazole nitrogen atoms are united with two carbon atoms in ortho position of an aromatic nucleus.

Especially valuable products are obtained if as starting materials imidazoles of the formula

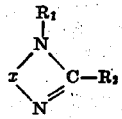

wherein $x$ stands for a radical of the benzene series containing a neutralised sulfonic acid group, $R_1$ stands for an alkyl radical, $R_2$ stands for an alkyl radical containing at least 11 carbon atoms and wherein $x$, $R_1$ and $R_2$ are free from hydrogen atoms bound to nitrogen atoms or to oxygen atoms adhering to carbon atoms, are used. Examples are the imidazoles of the formula

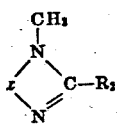

wherein $x$ stands for a radical of the benzene series containing a neutralised sulfonic acid group, $R_2$ stands for an odd number of carbon atoms between 10-20, and wherein $x$ and $R_2$ are free from hydrogen atoms bound to nitrogen atoms or to oxygen atoms adhering to carbon atoms.

1:2-alkylene oxides and their substitution products which come into consideration for the present processes are, for example, ethylene oxide, propylene oxide, glycides, as well as glycidic acid esters. Glycidol and esters of glycidic acid are examples of 1:2-alkylene oxides containing a reactive substituent.

The reaction between the imidazole compounds and the 1:2-alkylene oxides is preferably to be carried out at raised temperature, for example, at 100-150° C. When easily volatile alkylene oxides are used it is generally preferable to work under pressure. It is particularly advantageous if an excess of 1:2-alkylene oxide or its substitution product, for example, 4-8 molecules for every molecule of the imidazole compound, be used for the reaction.

The reaction products obtained by the present process, so far as they are water-soluble and are derived from suitable parent substances, may be used as textile auxiliary products, for example, as wetting, cleansing, washing, emulsifying, dispersing, foaming, softening, and levelling agents. For these purposes, those reaction products of imidazole compounds are particularly suitable which contain an aliphatic or cycloaliphatic radical of high molecular weight at the $\mu$-carbon atom or at the N-atom. Such products can form valuable products for use in the dyeing of wool. In many cases, in particular in the case of dyestuffs which contain metal in complex union, deeper and bloomier shades are yielded by the use of suitable products of the invention in the dyeing process.

The water-soluble products of the invention are to be distinguished from the parent imidazole compounds by an increased stability towards acids or an increased dispersing power with regard to sparingly soluble organic sulfonic acids in acid solutions.

The chemical constitution of the products obtainable according to the present invention could not be ascertained with certainty. Therefore the products are best characterised by their process of manufacture. In case more than two mols of an 1:2-alkylene oxide are used, ether radicals are introduced into the imidazole molecule, a hydrogen atom bound to a carbon atom being probably replaced by the ether radical. Since the hydrogen atoms bound to the carbon atoms occupying the $\alpha$-position of the $\mu$-substituent are especially reactive we may assume that such a hydrogen atom is replaced by an ether radical, for instance, by a polyglycol ether radical of the formula $$-CH_2-CH_2-O-[-CH_2-CH_2-O]_{n-2}-CH_2-CH_2-OH$$

in case ethylene oxide has been used ($n$ stands for a whole number and amounting at most to the number of mols of ethylene oxide that has been used). When the imidazole derivative is treated with at least two mols of glycidol, polyglycerol radicals are introduced into the molecule.

The products obtainable according to the present invention may be used alone or in combination with other substances, such as salts, particularly salts of weak acids, for example, sodium acetate; they may also be used together with solvents, soaps, soap-like substances, protective colloids, finishing, weighting, softening, or delustring agents and the like.

The following examples illustrate the invention the parts being by weight:

*Example 1*

25 parts of the sodium salt of sulfonated N-methyl-$\mu$-heptadecylbenzimidazole having the formula

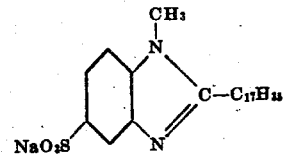

are heated in an autoclave fitted with stirrer with 22 parts, i. e., with about 10 molecules, of ethylene oxide at 135-140° C. until all the ethylene oxide has been taken up. The resinous reaction product, which is brownish in colour, and which may be stirred whilst hot, solidifies on cooling to give a solid mass which is readily soluble in water with a neutral reaction and yields a capillary active solution. When used in neutral and alkaline dyebaths, the product possesses exceptional levelling properties and gives a pleasant, soft handle to textiles treated with it.

In a similar manner, the sodium salt of N-methyl-$\mu$-undecyl-benzimidazole sulfonic acid, of the formula

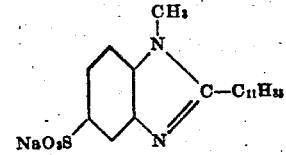

may be caused to react with about 10 molecules of ethylene oxide to yield a valuable textile auxiliary product. The product thus obtained is a solid substance easily soluble in water to form a neutral, capillary active solution.

Further, the alkali salts of sulfonated N-benzyl-, or N-ethyl-$\mu$-heptadecylbenzimidazole, or of sulfonated N-cyclohexyl-$\mu$-heptadecylbenzimidazole, or of the sulfonated N-methylated benzimidazole from o-phenylenediamine and succinic acid mono-dodecyl ester, or of the sulfonated, N-methylated naphthimidazole from 1:2-naphthylenediamine and stearic acid, or of N-methyl-$\mu$-hexadecylbenzimidazole, as well as sulfonated, non-neutralised N-dodecyl-$\mu$-propyl-benzimidazole may be used in place of the sodium salt of sulfonated N-methyl-$\mu$-heptadecylbenzimidazole mentioned above.

The products above described may be used as follows as levelling and softening agents:

In making a pale blue dyeing on tightly knitted viscose material, a dyebath is prepared at 40-50° C. containing 0.25% of Direct Sky Blue green shade (Colour Index No. 518) and 0.3 gram per litre of the product described above, obtained from the sodium salt of sulfonated N-methyl-$\mu$-heptadecylbenzimidazole. The material is entered into the dyebath, which is heated as usual until almost boiling, and dyeing is continued at this temperature for ½–1 hour. The addition of the product mentioned causes the dyestuff to be absorbed slowly and evenly by the material and thus yields a more level dyeing than if the operation be carried out without this addition. At the same time, the material receives a pleasant, soft handle.

*Example 2*

25 parts of N-methyl-μ-heptadecylbenzimidazole sulfonic acid sodium salt of the formula

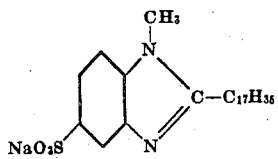

are pasted up with 15 parts, i. e., about 4 molecules, of glycidol and, whilst stirring, are gradually heated to 110° C. The mixture thus becomes a thin-flowing liquid, and a reaction sets in which causes lively evolution of heat. It is preferable to maintain the mixture at the temperature stated by external cooling. When the heat generation has finished, the reaction mixture is stirred for 1 hour at 120–130° C., a yellowish brown reaction product being obtained which may be stirred whilst still hot but which becomes viscous on cooling to room temperature. This product gives a clear solution in water, showing a neutral reaction; the solution possesses capillary activity. In contrast to the parent material, the new product is not precipitated from its solution even by mineral acids.

In place of the glycidol mentioned above, a glycidic acid ester can be used. Further, glycidol may be allowed to react, in a similar manner, with the imidazole derivatives mentioned in Example 1, instead of with the sodium salt of sulfonated N-methyl-μ-heptadecylbenzimidazole.

What we claim is:

1. A process for the manufacture of an imidazole derivative, which comprises reacting with each other, as sole reactants, at least one mol of a member of the group consisting of unsubstituted 1:2-alkylene oxides, hydroxy 1:2-alkylene oxides, and esters of carboxy 1:2-alkylene oxides, and a sulfonated μ- and N-substituted imidazole which is free from hydrogen atoms bound to nitrogen atoms and is free from hydroxy groups bound to carbon atoms and which contains the free trivalent nitrogen group —N= in the imidazole ring, both nitrogen atoms of the latter being trivalent.

2. A process for the manufacture of an imidazole derivative, which comprises reacting with each other, as sole reactants, at least two mols of a member of the group consisting of unsubstituted 1:2-alkylene oxides, hydroxy 1:2-alkylene oxides, and esters of carboxy 1:2-alkylene oxides, and an imidazole which contains the free trivalent nitrogen group —N= in the imidazole ring and which corresponds to the formula

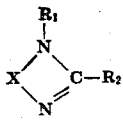

wherein X stands for a radical of the benzene series which contains a neutralized sulfonic acid group and is free from hydroxy groups bound to carbon atoms, R₁ stands for an alkyl radical, and R₂ stands for an alkyl radical containing at least 11 carbon atoms, both nitrogen atoms of the imidazole ring being trivalent.

3. A process for the manufacture of an imidazole derivative, which comprises reacting the imidazole of the formula

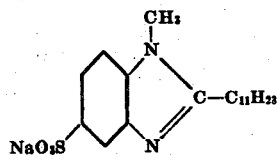

with 10 mols of ethylene oxide.

4. A process for the manufacture of an imidazole derivative, which comprises reacting the imidazole of the formula

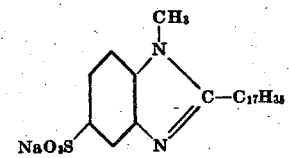

with 10 mols of ethylene oxide.

5. A process for the manufacture of an imidazole derivative, which comprises reacting the imidazole of the formula

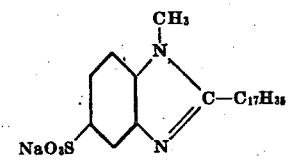

with 4 mols of glycidol.

6. A sulfonated imidazole derivative obtained by reacting with each other, as sole reactants, at least one mol of a member of the group consisting of unsubstituted 1:2-alkylene oxides, hydroxy 1:2-alkylene oxides, and esters of carboxy 1:2-alkylene oxides, and a sulfonated μ- and N-substituted imidazole which is free from hydrogen atoms bound to nitrogen atoms and is free from hydroxy groups bound to carbon atoms and which contains the free trivalent nitrogen group —N= in the imidazole ring, both nitrogen atoms of the latter being trivalent said derivative being, in the form of its alkali metal salt, a viscous to solid substance which is easily soluble in water to form a neutral capillary active substance.

7. A μ- and N-substituted imidazole derivative which contains a neutralized sulfonic acid group and at least one ether radical, which derivative is obtained by reacting with each other, as sole reactants, at least two mols of an unsubstituted 1:2-alkylene oxide and an imidazole which contains the free trivalent nitrogen group —N= in the imidazole ring and which corresponds to the formula

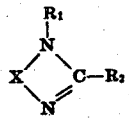

wherein X stands for a radical of the benzene series which contains a neutralized sulfonic acid group and is free from hydroxy groups bound to carbon atoms, R₁ stands for an alkyl radical, and R₂ stands for an alkyl radical containing at least 11 carbon atoms, both nitrogen atoms of the imidazole ring being trivalent, said derivative being, in the form of its alkali metal salt, a viscous to solid substance which is easily soluble in water to form a neutral capillary active substance.

8. The μ- and N-substituted imidazole derivative containing a neutralised sulfonic acid group and at least one polyglycol radical, which imidazole derivative is obtained by reacting the imidazole of the formula

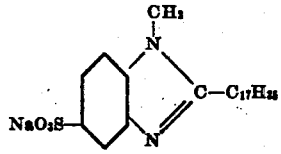

with 10 mols of ethylene oxide and is a solid substance easily soluble in water to form a neutral capillary active solution and possesses excellent equalizing and softening properties.

9. The μ- and N-substituted imidazole derivative containing a neutralised sulfonic acid group and at least one polyglycol radical, which imidazole derivative is obtained by reacting the imidazole of the formula

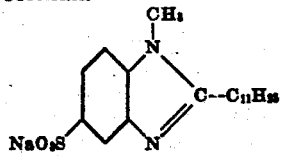

with 10 mols of ethylene oxide and is a solid substance easily soluble in water to form a neutral capillary active solution.

10. The μ- and N-substituted imidazole derivative containing a neutralised sulfonic acid group and at least one polyglycerol radical, which imidazole derivative is obtained by reacting the imidazole of the formula

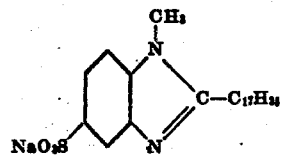

with four mols of glycidol and is a viscous substance easily soluble in water to form neutral capillary active solutions which are stable against mineral acids.

CHARLES GRAENACHER.
JOST FREI.